United States Patent
Meggiolan et al.

(10) Patent No.: US 12,498,062 B2
(45) Date of Patent: Dec. 16, 2025

(54) HYDRAULIC CONNECTOR FOR A HYDRAULIC SYSTEM OF A BICYCLE AND PROCESS FOR CONNECTING TOGETHER PIECES OF TUBE OF A HYDRAULIC SYSTEM OF A BICYCLE

(71) Applicant: CAMPAGNOLO S.R.L., Vicenza (IT)

(72) Inventors: Mario Meggiolan, Creazzo (IT); Filippo Bove, Padua (IT)

(73) Assignee: Campagnolo S.R.L., Vicenza (IT)

( * ) Notice: Subject to any disclaimer, the term of this patent is extended or adjusted under 35 U.S.C. 154(b) by 0 days.

(21) Appl. No.: 18/599,622

(22) Filed: Mar. 8, 2024

(65) Prior Publication Data

US 2024/0301975 A1    Sep. 12, 2024

(30) Foreign Application Priority Data

Mar. 9, 2023 (IT) .................. 102023000004470

(51) Int. Cl.
*F16L 19/065* (2006.01)
*B60T 17/04* (2006.01)
*B62L 3/02* (2006.01)

(52) U.S. Cl.
CPC .......... *F16L 19/065* (2013.01); *B60T 17/043* (2013.01); *B62L 3/023* (2013.01)

(58) Field of Classification Search
CPC ............... F16L 19/0206; F16L 19/0231; F16L 19/0237; F16L 19/065; F16L 19/08; F16L 19/10; B60T 17/043
USPC .................................. 285/342, 343, 353, 389
See application file for complete search history.

(56) References Cited

U.S. PATENT DOCUMENTS

| | | | | |
|---|---|---|---|---|
| 1,606,188 | A * | 11/1926 | Selah | F16L 19/083 16/DIG. 30 |
| 2,127,284 | A * | 8/1938 | Board | F16L 19/075 285/305 |
| 2,561,887 | A * | 7/1951 | Risley | F16L 19/08 285/341 |
| 2,761,702 | A * | 9/1956 | Noel | F16L 19/08 285/323 |

(Continued)

OTHER PUBLICATIONS

Italian Search Report issued for Italian Application No. 102023000004470 filed on Mar. 9, 2023 on behalf of Campagnolo S.r.l. Completion Date: Sep. 13, 2023. 7 Pages.

*Primary Examiner* — David Bochna
(74) *Attorney, Agent, or Firm* — Ipsilon USA—NLO (57) ABSTRACT

A hydraulic connector for removably joining together a first and a second piece of a tube of a hydraulic system of a bicycle includes a tubular sleeve extending along a middle axis, a first area of the tubular sleeve to be fixed to the first piece of tube, and a second area of the tubular sleeve to be fixed to the second piece of tube. The hydraulic connector also includes a first tubular segment and a second tubular segment. Both of the tubular segments extend along the middle axis and have an internal diameter adapted for receiving the pieces of tube to be joined. The hydraulic connector also includes a first hollow screw, in screwing engagement with the first area of the tubular sleeve, and the first tubular segment is formed in the first hollow screw. The tubular sleeve and the first hollow screw, in every section thereof along the middle axis, have an internal diameter equal to or greater than the internal diameter of the tubular segments.

14 Claims, 7 Drawing Sheets

(56) References Cited

U.S. PATENT DOCUMENTS

| | | | | |
|---|---|---|---|---|
| 3,653,695 | A * | 4/1972 | Dunton | F16L 19/08 |
| | | | | 285/342 |
| 4,893,846 | A * | 1/1990 | McGraw | F16B 7/0486 |
| | | | | 285/133.4 |
| 5,669,637 | A * | 9/1997 | Chitty | B01L 3/563 |
| | | | | 285/348 |
| 6,527,303 | B2 * | 3/2003 | Kariyama | B60T 17/043 |
| | | | | 285/341 |
| 10,131,339 | B2 | 11/2018 | Kariyama et al. | |
| 2006/0138771 | A1 * | 6/2006 | Galante | F16L 19/065 |
| | | | | 285/249 |
| 2017/0267223 | A1 * | 9/2017 | Meggiolan | B62L 1/005 |
| 2018/0356012 | A1 * | 12/2018 | Meggiolan | B29D 23/003 |

\* cited by examiner

HYDRAULIC CONNECTOR FOR A HYDRAULIC SYSTEM OF A BICYCLE AND PROCESS FOR CONNECTING TOGETHER PIECES OF TUBE OF A HYDRAULIC SYSTEM OF A BICYCLE

CROSS REFERENCE TO RELATED APPLICATIONS

The present application claims priority to Italian patent application No. 102023000004470 filed on Mar. 9, 2023, the contents of which are incorporated herein by reference in their entirety.

FIELD

The present application refers to a hydraulic system of a bicycle, in particular of a racing bicycle or in any case a high-performance bicycle.

BACKGROUND

Hereinafter, the term "hydraulic system" is meant to indicate a sub-system of the bicycle, which comprises a hydraulically-operating member (typically a disc brake caliper), a tube that contains operating liquid and is connected to such a member and a control device (typically a hydraulic pump actuated by a brake lever) connected to such a tube to induce an increase in pressure of the operating liquid in the tube, on command.

SUMMARY

Very often, bicycle manufacturers make a bicycle by assembling various components that are produced by other companies; even when the same company produces all of the components, it is possible and indeed normal for them to be assembled to obtain the complete bicycle in workshops if not actually in factories different from those where the single components are produced.

This way of operating is in fact suitable if not strictly necessary, since there are so many components of a bicycle that are very different from one another, so as to require completely different processing to be carried out, as well as clearly workers with very different technical specializations. Moreover, it is thus possible to test the components and verify their quality before they are assembled in the bicycle, thus avoiding wasted processing due to having mounted a component that then proves defective and must therefore be dismounted and replaced.

The hydraulic system is no exception. In other words, the hydraulic system—before being mounted in a bicycle—is already complete and thus comprises the hydraulically— operating member and the control device connected together by the tube, in which the operating liquid is also already present. In this way, the hydraulic system can be tested immediately, in the same factory or workshop where it was built, so as to be able to immediately verify whether it meets the required quality parameters.

Very often, however, the bicycle manufacturer wants the various components of the bicycle to be as hidden as possible, inside the frame and/or the handlebars; this is particularly true for cables and tubes, both for aesthetic reasons, and for aerodynamic reasons, particularly important in racing bicycles or in any case high-performance bicycles.

A complete hydraulic system, however, can be mounted with the tube hidden inside the frame and the handlebars only by separating the hydraulically-operating member from the control device; only this way, indeed, the tube can be made to pass into the internal cavities of the frame and of the handlebars.

Therefore, the mounting of the hydraulic system in the bicycle requires that the hydraulic system be divided: either by detaching the tube at one end or the other, or by cutting it. Thereafter, after having arranged the tube inside the cavities of the frame and the handlebars, it is possible to restore the whole thing, reconnecting that which had been disconnected.

A procedure often used particularly for racing or high-performance bicycles provides for the tube to be cut, close to the hydraulically-operating member or close to the control device, taking care not to let oil come out from the tube. Once the tube has been cut, the two pieces are closed with a sort of cap that also acts as guide for the guided insertion of the tube inside the frame and the handlebars. Once the tube has been arranged as desired, the two pieces must be reconnected so as to restore the continuity of the tube.

In order to carry out this reconnection, the two caps are removed from the respective pieces of tube and are replaced by hollow coupling terminals (commonly called needles) which allow the end portions of the pieces of tube to be stiffened. Thereafter, the two pieces of tube provided with the respective hollow coupling terminals are joined by inserting them in a sleeve connector; before insertion in the sleeve, however, a hollow screw and a deformable hydraulic sealing ring (commonly called O-ring) are slotted onto each piece. Once the piece of tube thus arranged has been inserted in the sleeve, the deformable ring and the hollow screw that had been slotted on the piece of tube are also pushed into the sleeve; the hollow screw is engaged in a corresponding threading provided in the sleeve and then tightened, so as to press on the deformable ring that is thus deformed so as to sealably constrain the piece of tube in the sleeve. Once these operations have been carried out on the two pieces of tube, the continuity of the tube is restored.

Such a process and a relative connector are described for example in US2014/0038757, the contents of which are incorporated herein by reference in their entirety.

The inventor has noted that with such a process a certain amount of air remains in the reconnected tube, due to the fact that the ends of the two pieces of tube joined inside the sleeve remain spaced apart, due to the presence of a central shoulder in the sleeve. This shoulder, however, is necessary to determine with certainty the abutment position of the pieces of tube and thus to ensure that the connection inside the sleeve is good. Indeed, in the absence of such a shoulder, not only would the initial position of the piece of tube at the moment of its insertion in the sleeve be uncertain, but such a position could easily change uncontrollably during the compression of the deformable ring, due to the high stresses involved in the tightening of the hollow screw on the deformable ring.

Since air is much more compressible than operating liquid, its presence in the tube would at the minimum result in a delayed response of the hydraulic system, if not an actual total lack of response. In order to avoid this risk (very dangerous, if the system is intended for braking the bicycle), it is thus necessary to take care of purging the air from the system after having completed the connection.

The inventor has thus recognized that there is the problem of avoiding the inclusion of air inside the hydraulic system when it is restored after having been divided, so as to be able to avoid purging the hydraulic system.

Such a problem is solved by a connector according to claim 1 and by a process according to claim 10. Preferred features are contained in the dependent claims.

In accordance with a first aspect of the present application, the hydraulic connector, for removably joining together a first and a second piece of a tube of a hydraulic system of a bicycle, comprises:

- a tubular sleeve extending along a middle axis,
- a first area of the tubular sleeve intended for fixing to the first piece of tube and a second area of the tubular sleeve intended for fixing to the second piece of tube,
- a first tubular segment and a second tubular segment, wherein both of the tubular segments extend along the middle axis and have internal diameter adapted for receiving the pieces of tube to be joined,
- a first hollow screw, in screwing engagement with the first area of the tubular sleeve, wherein the first tubular segment is formed in the first hollow screw;

and is characterized in that the tubular sleeve and the first hollow screw—in every section thereof along the middle axis—have internal diameter equal to or greater than the internal diameter of the tubular segments.

In the sleeve of this connector there is thus no shoulder that prevents the two pieces of tube from being arranged directly abutting against one another. It is thus possible to avoid introducing air into the tube of the hydraulic system. It should also be noted that the connector can be dismounted and remounted as desired, whenever there is a need to separate the two pieces of tube.

Preferably, the connector comprises a first throttled section in the first area of the tubular sleeve, formed inside the tubular sleeve coaxially to the middle axis, having internal diameter equal to the internal diameter of the tubular segments. This throttled section does not obstruct the insertion of the end of the piece of tube (its internal diameter is such as to allow the piece of tube to pass), but rather promotes the correct positioning thereof in the radial direction.

Preferably, the connector comprises:

- a first annular cavity in the first area of the tubular sleeve, formed inside the tubular sleeve coaxially to the middle axis, the first annular cavity having diameter greater than the internal diameter of the tubular segments,
- a first deformable hydraulic sealing ring inserted in the first annular cavity.

In this way, by tightening the first hollow screw a compression of the deformable ring in the first annular cavity is obtained. The deformable ring is thus deformed until it fills the first annular cavity, so as to seal the first piece of tube in the tubular sleeve. The first throttled section also performs the function of holding back the material of the first deformable ring when it is deformed by tightening the first hollow screw.

Preferably, the connector comprises a second hollow screw, in screwing engagement with the second area of the tubular sleeve, wherein the second tubular segment is formed in the second hollow screw.

Preferably, the connector comprises a second throttled section in the second area of the tubular sleeve, formed inside the tubular sleeve coaxially to the middle axis and having internal diameter equal to the internal diameter of the tubular segments.

Preferably, the connector comprises:

- a second annular cavity in the second area of the tubular sleeve, formed inside the tubular sleeve coaxially to the middle axis, axially aligned between the second hollow screw and the second throttled section, the second annular cavity having diameter greater than the internal diameter of the tubular segments,
- a second deformable hydraulic sealing ring inserted in the second annular cavity.

The connector thus allows the two pieces of tube to be sealed in the same way.

Preferably, the first and the second throttled section are axially aligned, the one extending on from the other, so as to form a single throttling in a central area of the tubular sleeve. At such throttling the centered positioning of the two ends of the two pieces of tube takes place, directly resting on one another in the axial direction.

Preferably, the first and the second piece of tube are provided with respective hollow coupling terminals, having external diameter equal to the external diameter of the tube. These coupling terminals provide a stiffening to the ends of the pieces of tube and in this way facilitate the sealed tightening of the pieces of tube, whether it is obtained with the deformable ring, or whether it is obtained in another way.

In accordance with a second aspect of the present application, the process for connecting together a first and a second piece of a tube of a hydraulic system of a bicycle through a tubular sleeve, comprises in sequence the steps of:

- inserting a cap in the tubular sleeve from a first end thereof until it reaches a central area of the tubular sleeve,
- inserting the second piece of tube in the tubular sleeve from a second end thereof, until it rests axially directly against the cap,
- sealably constraining the second piece of tube to the tubular sleeve,
- removing the cap from the tubular sleeve,
- inserting the first piece of tube in the tubular sleeve from the first end thereof, until it rests axially directly against the second piece of tube,
- sealably constraining the first piece of tube to the tubular sleeve.

Thanks to this process and to the use of the cap provided in it, it is possible to perfectly center the ends of the pieces of tube inside the tubular sleeve, without the need for any shoulder and thus allowing the two pieces of tube to directly abut against one another. The spacing due to the presence of the shoulder and the consequent inevitable entry of air into the tube during the connection operation are thus avoided.

Preferably, the process comprises the steps of:

- preparing the first piece of tube by firstly slotting on top a first hollow screw, having internal diameter equal to the external diameter of the tube, then slotting on top a first deformable hydraulic sealing ring, and finally slotting a hollow first coupling terminal inside,
- arranging the tubular sleeve, which extends along a middle axis between the first and the second end and comprises, at the first axial end, a first area adapted for receiving the first hollow screw in screwing engagement and, internally, a first throttled section having internal diameter equal to the external diameter of the tube,
- arranging the cap, having a cap body with an external threading corresponding to that of the first hollow screw and an enlarged cap head, the cap body having axial extension equal to half the axial extension of the tubular sleeve,
- inserting the cap in the tubular sleeve, screwing the cap body thereof in the first area of the tubular sleeve, until the cap head abuts against the tubular sleeve,
- preparing the second piece of tube slotting a hollow second coupling terminal inside it, inserting the second piece of tube in the tubular sleeve from the second end thereof, until the second coupling terminal is made to rest axially directly against the cap, after having sealably constrained the second piece of tube to the tubular sleeve and having removed the cap, inserting the first piece of tube in the tubular sleeve from the first end thereof, until the first coupling terminal is made to rest axially directly against the second coupling terminal, pushing the first deformable hydraulic sealing ring slotted on the first piece of tube inside the tubular sleeve, until the first throttled section is reached, screwing the first hollow screw to the tubular sleeve, forcing and thus deforming the first deformable ring between the first piece of tube and the tubular sleeve, so as to sealably constrain the first piece of tube in the tubular sleeve.

The first piece of tube is thus sealably constrained in a secure manner, thanks to the first deformable ring that is indeed deformed by the thrusting of the first hollow screw.

The second piece of tube can, on the other hand, be sealably constrained to the tubular sleeve in another way, for example through crimping of the tubular sleeve on the second piece of tube.

Preferably, the process also comprises the step of:

further preparing the second piece of tube firstly by slotting on top a second hollow screw, having internal diameter equal to the external diameter of the tube, then slotting on top a second deformable hydraulic sealing ring, wherein the tubular sleeve comprises, at the second axial end, a second area adapted for receiving the second hollow screw in screwing engagement and, inside, a second throttled section having internal diameter equal to the external diameter of the tube, wherein the step of sealably constraining the second piece of tube to the tubular sleeve comprises:

pushing the second deformable hydraulic sealing ring slotted on the second piece of tube inside the tubular sleeve, until the second throttled section is reached, screwing the second hollow screw to the tubular sleeve, forcing and thus deforming the second deformable ring between the second piece of tube and the tubular sleeve, so as to sealably constrain the second piece of tube in the tubular sleeve.

The second piece of tube is thus sealably constrained in a secure manner in the same way as the first piece of tube, thanks to the second deformable ring that is indeed deformed by the thrusting of the second hollow screw.

DESCRIPTION OF THE DRAWINGS

Further features and advantages of the present application will be more evident from the following description of preferred embodiments thereof made with reference to the appended drawings. In such drawings.

DETAILED DESCRIPTION

Figure 1:
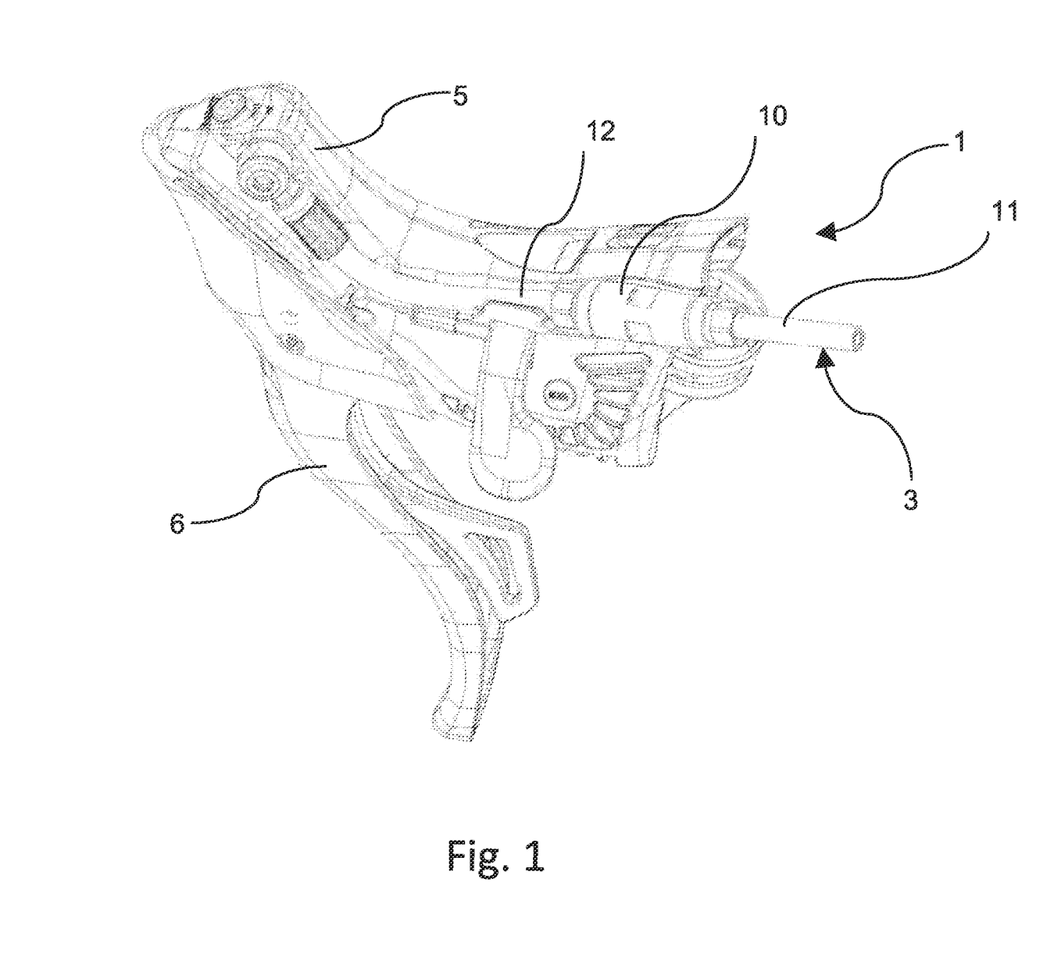
FIG. 1 is a partial view of a hydraulic system of a bicycle, including a hydraulic connector according to the disclosure.

In the figures, particularly in FIG. 1, reference numeral 1 schematically indicates a hydraulic system for a bicycle, in particular a braking system for a racing bicycle. The hydraulic system 1 comprises a tube 3 connected on one side to a disc brake caliper (not shown) and on the other side to a pump 5, able to be actuated through a brake lever 6; the tube 3 contains an operating liquid (not highlighted in the figures), for example a so-called brake oil. The details of the pump 5 are not highlighted and will not be described, since they are per se conventional and not part of the present application.

On the tube 3 there is a hydraulic connector 10, which will now be described with reference to its mounted condition on the tube 3, illustrated in FIG. 2.

The hydraulic connector 10 fits and sealably joins together, in a removable manner, a first piece of tube 11 and a second piece of tube 12 of the hydraulic system 1; the two pieces of tube 11 and 12 can be—for example—the result of cutting of the tube 3. The two pieces of tube 11 and 12 are provided with respective hollow coupling terminals 13 and 14, each forcibly inserted at the end of the respective piece of tube 11 or 12. These coupling terminals 13 and 14 (also called needles, as already stated) are the same as each other and comprise respective main portions 15 and 16, inserted in the pieces of tube 11 and 12, and respective projecting heads 17 and 18, having external diameter substantially equal to the external diameter of the tube 3.

Figure 2:
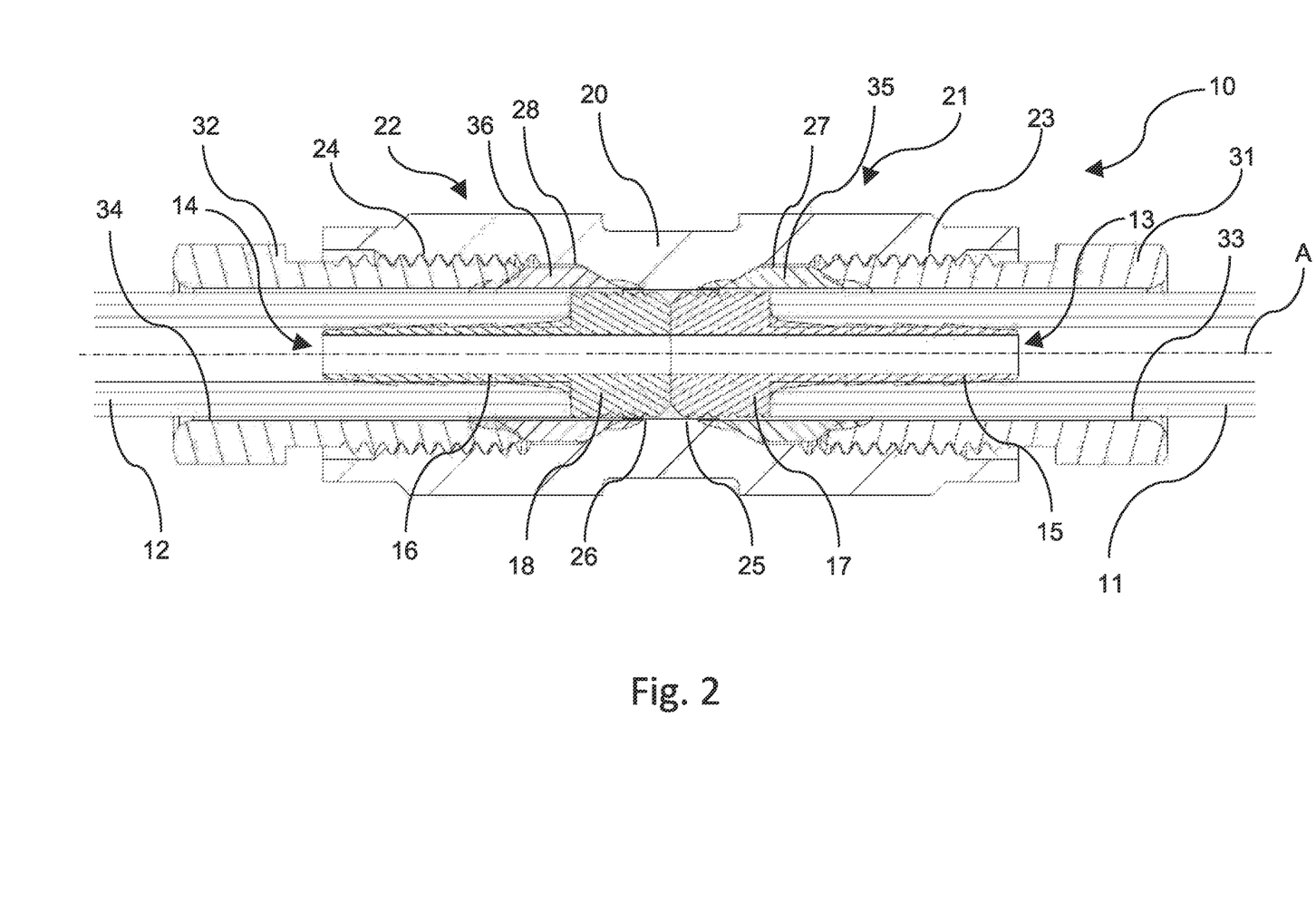
FIG. 2 is an axial section view of the hydraulic connector of the hydraulic system of FIG. 1.

The hydraulic connector 10 comprises a tubular sleeve 20, which extends along its own middle axis A, coinciding with the axis of the pieces of tube 11 and 12 when they are mounted in the hydraulic connector 10 (as shown in FIG. 2). The tubular sleeve 20 comprises—towards a first end thereof—a first area 21 (to the right in FIG. 2) and intended for fixing the first piece of tube 11 and provided with an internal threading 23, and—towards a second end thereof—a second area 22 (to the left in FIG. 2), intended for fixing the second piece of tube 12 and provided with an internal threading 24.

The hydraulic connector 10 also comprises a first hollow screw 31 and a second hollow screw 32. When the hydraulic connector 10 is mounted, the first hollow screw 31 is in screwing engagement with the tubular sleeve 20, screwed into the internal threading 23 of the first area 21; similarly, the second hollow screw 32 is in screwing engagement with the tubular sleeve 20, screwed into the internal threading 24 of the second area 22 thereof. For obvious practical reasons, the first and the second hollow screw 31 and 32 are preferably the same as each other, just as the two internal threadings 23 and 24 are the same as each other.

A first tubular segment 33 and a second tubular segment 34 are respectively segments of and formed in the first hollow screw 31 and in the second hollow screw 32, both extending along the middle axis A and having an internal diameter corresponding to the external diameter of the tube 3, so that the pieces of tube 11 and 12 can be inserted there without excessive forcing, but also without leaving significant clearance.

The hydraulic connector 10 also comprises a first throttled section 25 and a second throttled section 26, which are sections of and formed inside the tubular sleeve 20, in its first area 21 and in its second area 22, respectively. These two throttled sections 25 and 26 of the tubular sleeve 20, as well as the two tubular segments 33 and 34 of the hollow screws 31 and 32, have diameter corresponding to the external diameter of the tube 3, so that the pieces of tube 11 and 12 can be inserted there without excessive forcing, but also without leaving a significant clearance.

Thus, the tubular sleeve 20, the first hollow screw 31 and the second hollow screw 32—in every section thereof along the middle axis A—have an internal diameter equal to or greater than the internal diameter of the first tubular segment 33 and the second tubular segment 34, and have internal diameter equal to or greater than the external diameter of the pieces of tube 11 and 12, so as to be able to accommodate such pieces of tube 11 and 12 without excessive forcing, but without leaving a significant clearance. Preferably, the internal diameter of the first throttled section 25, of the second throttled section 26, of the first tubular segment 33 and of the second tubular segment 34 are substantially constant and equal to each other.

Preferably, as can be seen in FIG. 2, the two axially aligned throttled sections 25 and 26 are adjacent and in extension of one another, so as to form a single throttling in central position in the tubular sleeve 20.

The connector 10 also comprises a first annular cavity 27 and a second annular cavity 28, respectively formed in the tubular sleeve 20 between the first throttled section 25 and the first hollow screw 31 and between the second throttled section 26 and the second hollow screw 32. The first annular cavity 27 and the second annular cavity 28, the same as each other, have a diameter greater than the external diameter of the tube 3 and thus than the internal diameter of the tubular segments 33 and 34.

Respective deformable rings (also called O-rings, as already stated) 35 and 36, which are compressed and deformed by the tightening of the hollow screws 31 and 32 so as to ensure the hydraulic seal between the pieces of tube 11 and 12 and the tubular sleeve 20 are inserted in the two annular cavities 27 and 28.

Figure 7:
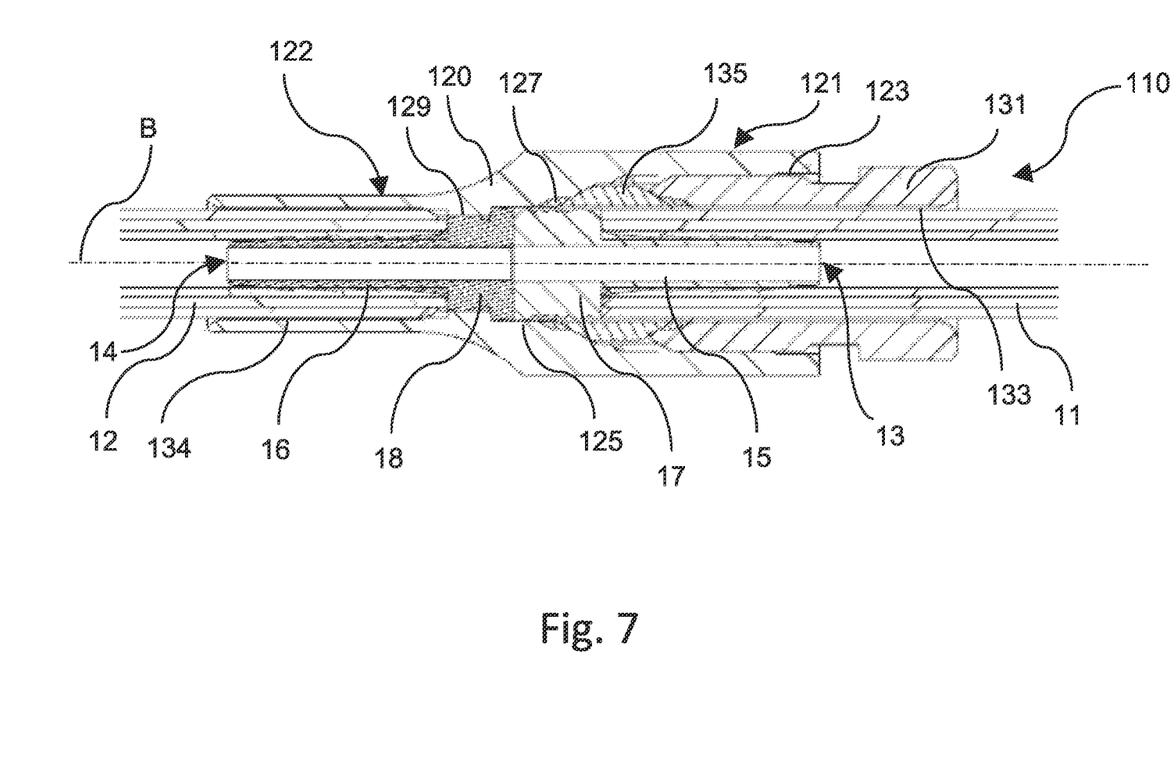
FIG. 7 is an axial section view of a variant of the hydraulic connector.
Figure 8:
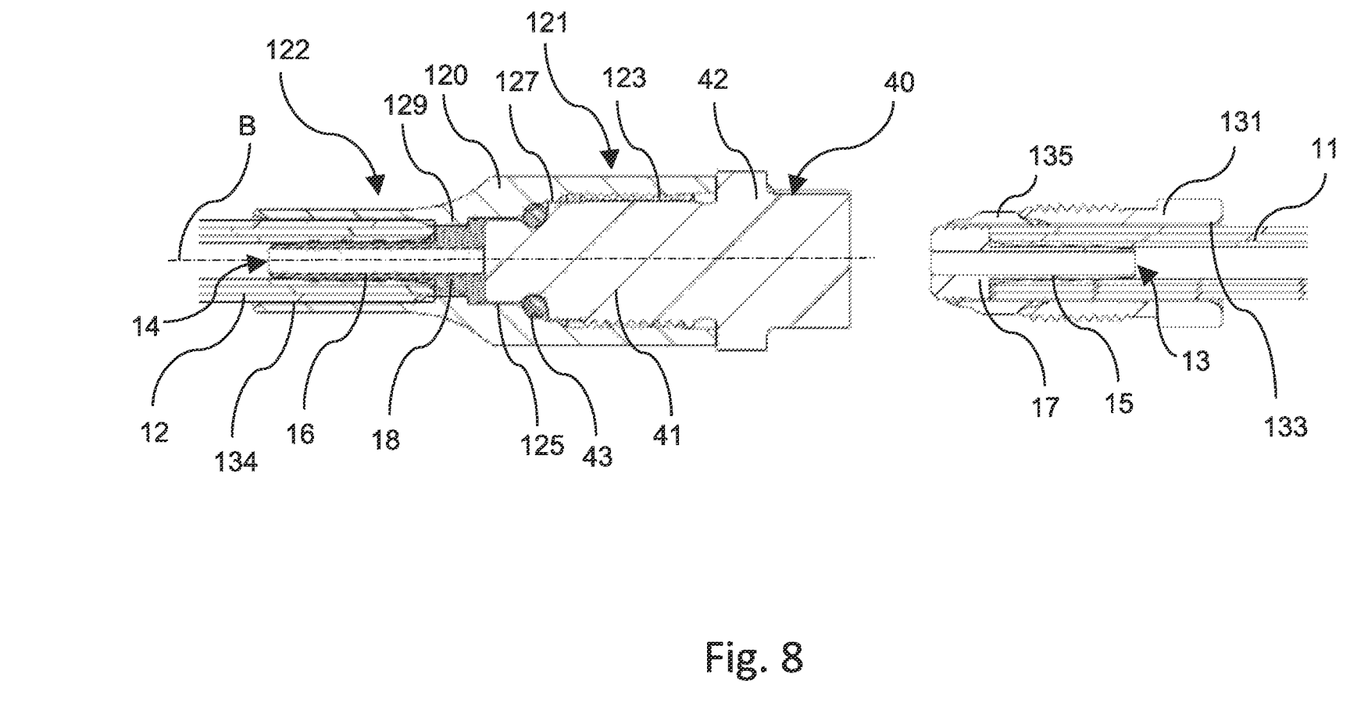
FIG. 8 is an axial section view of the connector of FIG. 7 during the application thereof, in a step in which the cap is in use.

FIGS. 7 and 8 show a variant of the hydraulic connector, indicated with 110. The hydraulic connector 110 half (precisely the right half in FIG. 7) corresponds to the hydraulic connector 10, whereas the other half is simplified.

Figure 9:
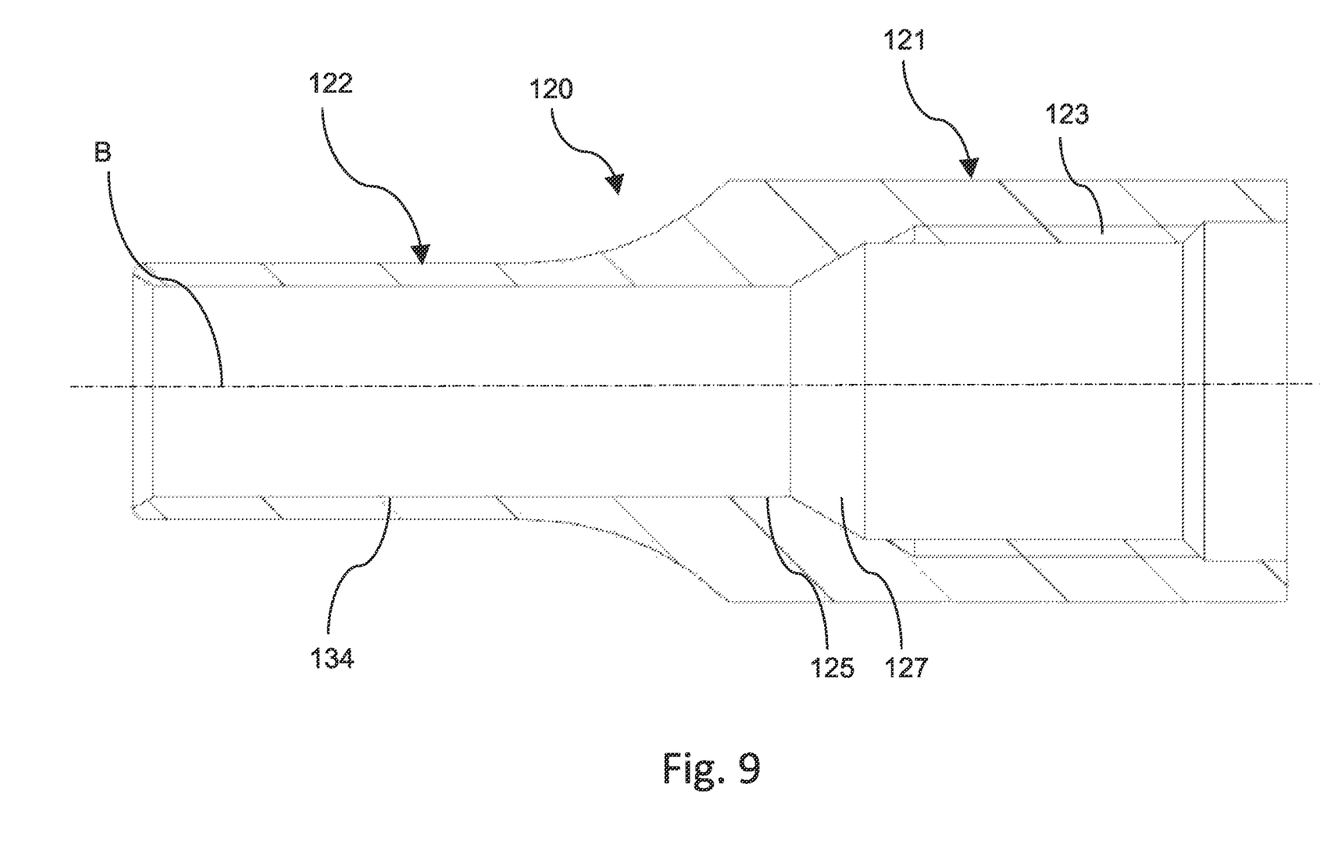
FIG. 9 is a section view of only the sleeve of the connector of FIG. 7, before the application of the connector.

Therefore, the hydraulic connector 110 comprises a tubular sleeve 120 (depicted in FIG. 9 separately from the other elements of the connector 110), which extends along its own middle axis B, coinciding with the axis of the pieces of tube 11 and 12 when they are mounted in the hydraulic connector 110. The tubular sleeve 120 comprises—towards a first end thereof—a first area 121, intended for fixing the first piece of tube 11 and provided with an internal threading 123, and—towards a second end thereof—a second area 122, intended for fixing the second piece of tube 12 and without internal threading.

The hydraulic connector 110 also comprises a first hollow screw 131. When the hydraulic connector 110 is mounted, the first hollow screw 131 is in screwing engagement with the tubular sleeve 120, screwed into the internal threading 123 of the first area 121.

A first tubular segment 133 is formed in the first hollow screw 31, whereas a second tubular segment 134 is formed in the sleeve 120 itself, in its second area 122. The two tubular segments 133 and 134 both extend along the middle axis B and have an internal diameter corresponding to the external diameter of the tube 3, so that the pieces of tube 11 and 12 can be inserted there without excessive forcing, but also without leaving a significant clearance.

The hydraulic connector 110 also comprises a first throttled section 125, formed inside the tubular sleeve 120, in its first area 121. This throttled section 125, as well as the two tubular segments 133 and 134, have diameter corresponding to the external diameter of the tube 3, so that the pieces of tube 11 and 12 can be inserted there without excessive forcing, but also without leaving a significant clearance.

Preferably, as can be seen in FIG. 7, the first throttled section 125 is axially aligned and adjacent to the second tubular segment 134, so as to be substantially in extension thereof.

The connector 110 also comprises a first annular cavity 127, formed in the tubular sleeve 120 between the first throttled section 125 and the first hollow screw 131. The first annular cavity 127 has an external diameter greater than the external diameter of the tube 3 and thus than the internal diameter of the tubular segments 133 and 134.

A respective deformable ring 135, which is compressed and deformed by the tightening of the hollow screw 131 so as to ensure the hydraulic seal between the first piece of tube 11 and the tubular sleeve 120, is inserted in the annular cavity 127.

In the connector 110, the hydraulic seal between the second piece of tube 12 and the tubular sleeve 120 is obtained differently than in the connector 10. In the connector 110, indeed, the second area 122 of the tubular sleeve 120 is crimped (i.e. plastically deformed, with a suitable tool) over the second piece of tube 12; it should be noted that the crimping is made possible by the rigidity of the second piece of tube 12, stiffened by the presence of the coupling terminal 14. In order to allow the crimping, the tubular sleeve 120 is made of a relatively soft metallic material and thus malleable by compression; it can be seen in FIG. 7 the material of the sleeve 120 that—after crimping—penetrates into a throat 129 provided between the end of the piece of tube 12 and the head 18 of its coupling terminal 14.

The process according to which the connector 10 is used to connect the two pieces 11 and 12 will now be described, with particular reference to the situation in which the operation is carried out on a hydraulic system 1 for a bicycle and therefore the two pieces 11 and 12 have been obtained already through cutting of the tube 3. The process is however also applicable to any other occasion in which a connection must be carried out between the two pieces of tube 11 and 12, for example because it is wished to dismount the hydraulic system 1 from a bicycle, to replace it or to replace some parts thereof. The successive steps of the mounting of the connector 10 on the pieces of tube 11 and 12 are shown in FIGS. 3 to 6.

Figure 3:
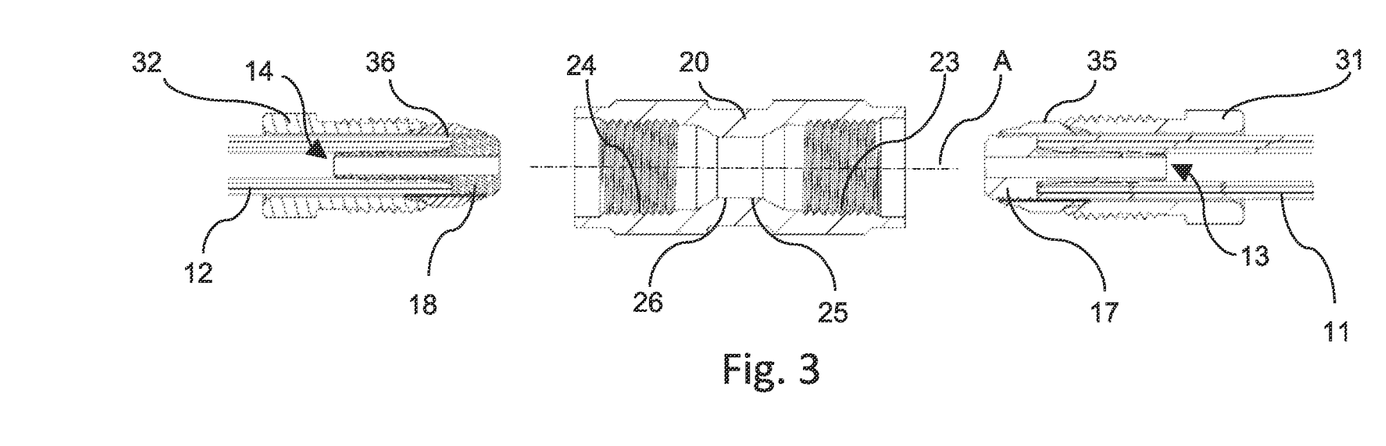
FIGS. 3 to 6 are axial section views of the hydraulic connector of FIG. 2 during successive steps of its application.

The initial condition is shown in FIG. 3: the two pieces of tube 11 and 12 are separate, awaiting connection through the connector 20.

In order to carry out the connection, it is provided for to arrange an auxiliary element, in particular a cap 40, which does not form part of the connector 10 and which will not be present in the connection once it has been completed. The cap 40 has a cap body 41, which has an axial extension equal to half the axial extension of the tubular sleeve 20 and is provided with an external threading corresponding to that of the first hollow screw 31. The cap 40 also has an enlarged head 42. An elastic ring 43 is provided on the cap body 41.

Figure 4:
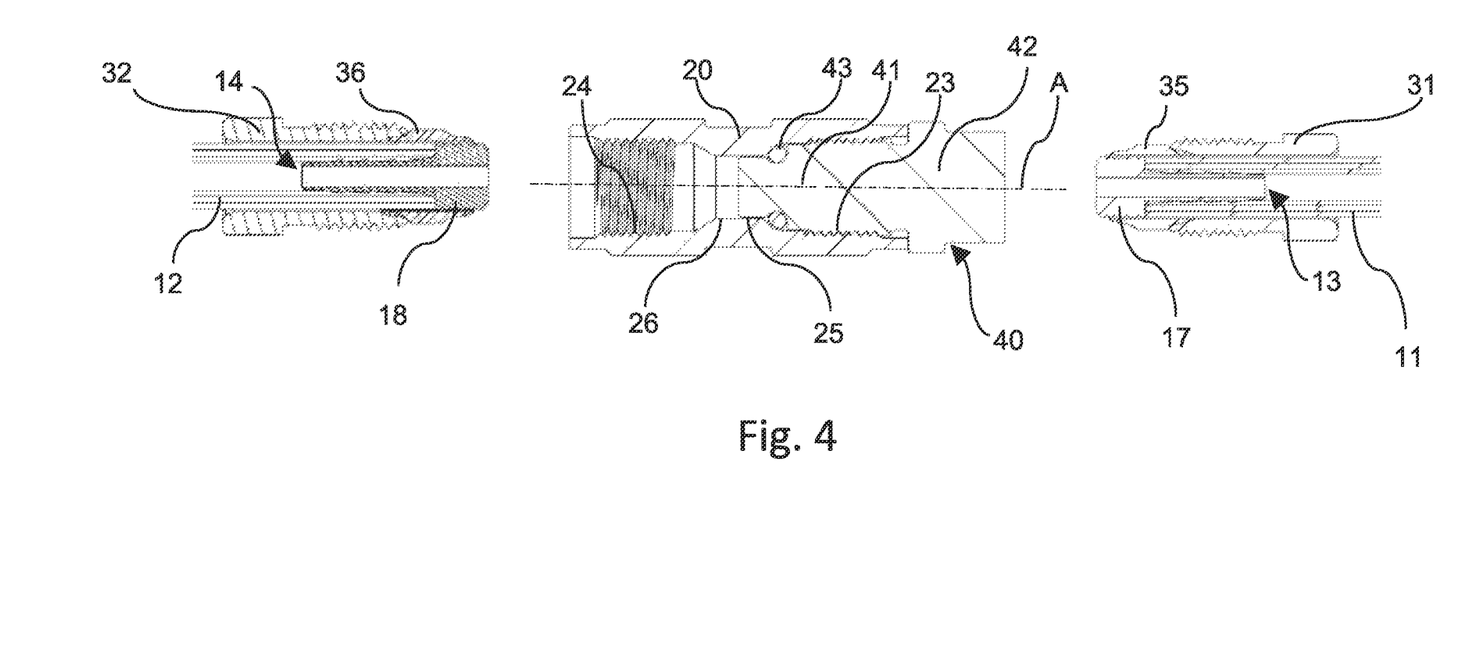

The cap 40 is therefore inserted in the tubular sleeve 20, screwing the cap body 41 into the first area 21 until the enlarged head 42 abuts against the tubular sleeve 20, see FIG. 4. At this point, the end of the cap body 41 is located inside the tubular sleeve 20, half way along the axial extension of the tubular sleeve 20 itself.

The second piece of tube 12 is then prepared (if not already prepared before), by slotting the coupling terminal 14 inside and slotting on top firstly the second hollow screw 32, then the deformable ring 36.

At this point, the second piece of tube 12 is inserted in the tubular sleeve 20 from the second end thereof, until the second piece of tube 12 is rested axially with the second coupling terminal 14 directly against the cap body 41 of the cap 40.

Thereafter, the deformable ring 36 is pushed inside the tubular sleeve 20, until it reaches the second throttled section 26; in order to do this, the second hollow screw 32 can be used to help. The same second hollow screw 32 is then screwed into the second area 22 and forced so as to compress the deformable ring 36 such as to deform it in the second annular cavity 28, so as to sealably constrain the second piece of tube 12 in the tubular sleeve 20; see FIG. 5.

Figure 5:
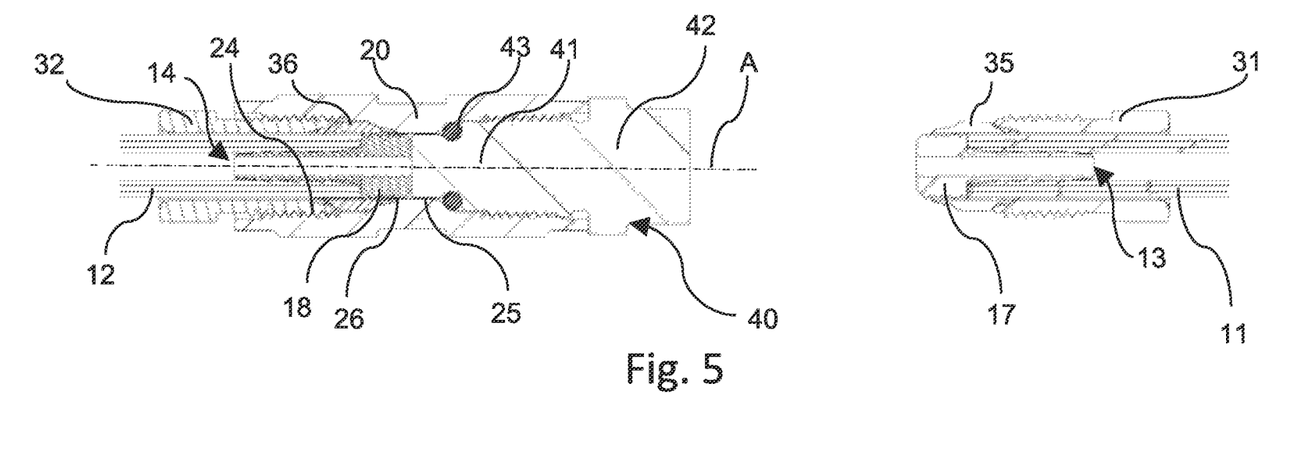

In this last step, the second piece of tube 12 does not move, remaining rested with the second coupling terminal 14 against the cap 40, i.e. half way along the tubular sleeve 20.

After the second piece of tube 12 has been sealably constrained in the tubular sleeve 20, the cap 40 is then removed, unscrewing it.

Figure 6:
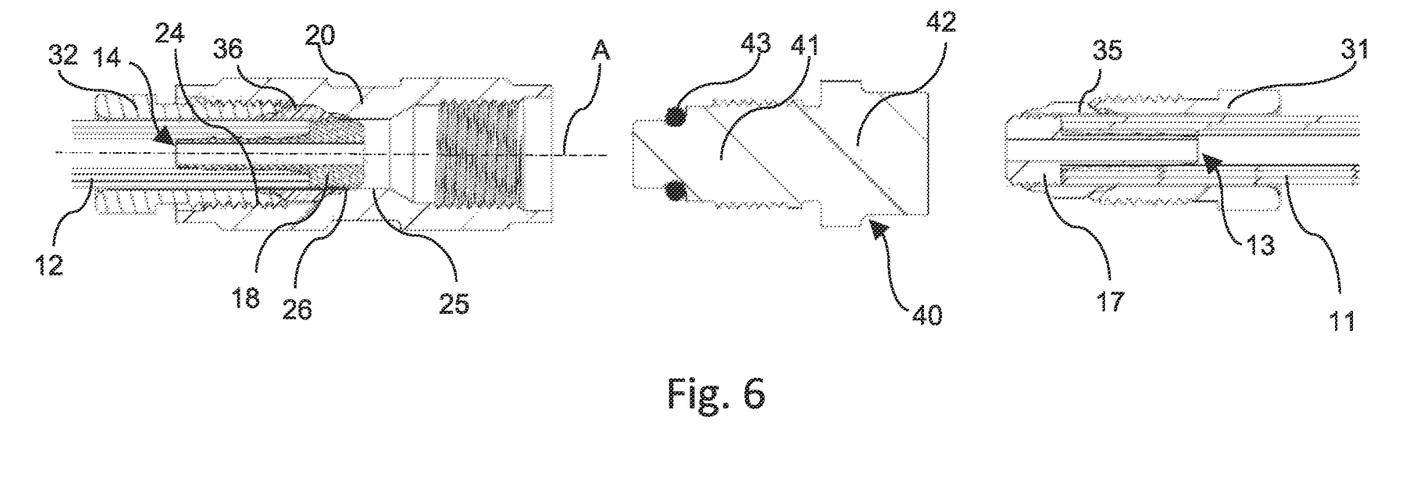

The first piece of tube 11 is then prepared (if not already prepared before), by slotting the coupling terminal 13 inside and slotting on top firstly the first hollow screw 31, then the deformable ring 35, see FIG. 6.

At this point, the first piece of tube 11 is inserted in the tubular sleeve 20 from the first end thereof, until the first piece of tube 11 is made to rest axially with the first coupling terminal 13 directly against the second coupling terminal 14, which at this point no longer has the possibility of moving inside the tubular sleeve 20 in which it has been constrained.

Thereafter, the deformable ring 35 is pushed inside the tubular sleeve 20, until it reaches the first throttled section 25; in order to do this, the first hollow screw 31 can be used to help. The same first hollow screw 31 is then screwed into the first area 21 and forced so as to compress the deformable ring 35 such as to deform it in the first annular cavity 27, so as to sealably constrain the first piece of tube 11 in the tubular sleeve 20.

In this last step, the first piece of tube 11 does not move, remaining rested with the first coupling terminal 13 against the coupling terminal 14 of the second piece of tube 12, half way along the tubular sleeve 20.

At the end, as can be seen in FIG. 2, the two pieces of tube 11 and 12 are firmly sealably connected by the connector 10. Since there is no free space between the two coupling terminals 13 and 14 that are rested directly against one another, it is possible to avoid air penetrating in the tube 3 in the connection operations; it is thus possible to avoid having to carry out a purging of the hydraulic system 10 after the connection.

This connection is also removable. If necessary, indeed, it is possible to once again separate the two pieces of tube 11 and 12, unscrewing one or the other of the two hollow screws 31 or 32 so as to free one of the two pieces of tube 11 and 12. Thereafter, it will then be possible to reconnect the separated piece of tube, whether it is the first piece of tube 11 or the second piece of tube 12, proceeding as indicated earlier for the first piece of tube 11; for this operation, it is no longer necessary to use the cap 40, because the presence of the other piece of tube 11 or 12, still constrained in the sleeve 20, ensures the correct positioning of the piece of tube 11 or 12 that had been separated.

The process to obtain the connection with the connector 110 corresponds to that just described for the connector 10, except for the way in which the second piece of tube 12 is constrained.

In order to carry out the connection, the cap 40 is therefore inserted in the tubular sleeve 120, screwing the cap body 41 into the first area 121 until the enlarged head 42 abuts against the tubular sleeve 120. At this point, the end of the cap body 41 is located inside the tubular sleeve 120, half way along the axial extension of the tubular sleeve 120 itself.

The second piece of tube 12 is then prepared (if not already prepared before), by slotting the coupling terminal 14 inside.

At this point, the second piece of tube 12 is inserted in the tubular sleeve 120 from the second end thereof, until the second piece of tube 12 is rested axially with the second coupling terminal 14 directly against the cap body 41 of the cap 40.

Thereafter, the second area 122 of the tubular sleeve 120 is crimped on the second piece of tube 12, so as to sealably constrain the second piece of tube 12 in the tubular sleeve 120; see FIG. 8.

In this last step, the second piece of tube 12 does not move, remaining rested with the second coupling terminal 14 against the cap 40, i.e. half way along the tubular sleeve 120.

After the second piece of tube 12 has been sealably constrained in the tubular sleeve 120, the cap 40 is then removed, unscrewing it.

The first piece of tube 11 is then prepared (if not already prepared before), by slotting the coupling terminal 13 inside and slotting on top firstly the first hollow screw 131, then the deformable ring 135.

At this point, the first piece of tube 11 is inserted in the tubular sleeve 20 from the first end thereof, until the first piece of tube 11 is made to rest axially with the first coupling terminal 13 directly against the second coupling terminal 14, which no longer has the possibility of moving inside the tubular sleeve 120 in which it has been constrained.

Thereafter, the deformable ring 135 is pushed inside the tubular sleeve 120, until it reaches the first throttled section 125; in order to do this, the first hollow screw 131 can be used to help. The same first hollow screw 131 is then screwed into the first area 121 and forced so as to compress the deformable ring 135 such as to deform it in the first annular cavity 127, so as to sealably constrain the first piece of tube 11 in the tubular sleeve 120.

In this last step, the first piece of tube 11 does not move, remaining rested with the first coupling terminal 13 against the coupling terminal 14 of the second piece of tube 12, half way along the tubular sleeve 20.

At the end, as can be seen in FIG. 7, the two pieces of tube 11 and 12 are firmly sealably connected by the connector 110.

This connection is also removable. If necessary, indeed, it is possible to again separate the two pieces of tube 11 and 12, by unscrewing the hollow screw 131 so as to free the first piece of tube 11. Thereafter, it will then be possible to reconnect the piece of tube 11, proceeding as indicated earlier; for this operation, it is no longer necessary to use the cap 40, because the presence of the second piece of tube 12, still constrained in the tubular sleeve 120, ensures the correct positioning of the piece of tube 11 that had been separated.

Therefore, the connector 110 is still removable from the tube 3, like the connector 10, but differently from the latter is removable only at one point and not two: indeed, it is possible to remove the first piece of tube 11, but not the second piece of tube 12 from the tubular sleeve 120.

Also with the connector 110, there is no free space between the two coupling terminals 13 and 14 that are rested directly against one another and it is therefore possible to avoid air penetrating in the tube 3 in the connection operations; it is thus possible to avoid having to carry out a purging of the hydraulic system 10 after the connection.

It should be noted that the cap 40, as well as acting as auxiliary element for the correct mounting of the connector 10, 110, can also act to keep the piece of tube 12 closed, when the connection has been opened by removing the piece of tube 11 from the connector 10, 110. Thanks to the presence of the elastic ring 43, indeed, the cap 40 hermetically closes the tubular sleeve 20, 120 towards the right (in the direction of the figures), allowing the piece of tube 12 to be hermetically closed. It is thus possible, for example, to transport the part of the hydraulic system 1 that includes the piece of tube 12 leaving the operating liquid inside. In this case, the other part of the hydraulic system 1 can also be transported leaving the operating liquid inside, after having closed the end of the piece of tube 11 with a suitable member, for example a tube-guide (also called needle drive) that is suitably shaped.

The invention claimed is:

1. A hydraulic system of a bicycle comprising:
   a first piece of tube and a second piece of tube, each of the first piece of tube and the second piece of tube provided with a respective hollow coupling terminal at least partially inserted therein,
   wherein each hollow coupling terminal comprises a projecting head having an external diameter substantially equal to the external diameter of the respective piece of tube;
   a hydraulic connector, for removably joining together the first piece of tube and the second piece of tube, the hydraulic connector comprising:
      a tubular sleeve extending along a middle axis, wherein a first area of the tubular sleeve is configured to be fixed to the first piece of tube and a second area of the tubular sleeve is configured to be fixed to the second piece of tube,
      a first tubular segment and a second tubular segment, both extending along the middle axis and having an internal diameter configured for receiving the first piece of tube and the second piece of tube to be joined, and
      a first hollow screw, in screwing engagement with the first area of the tubular sleeve, wherein the first tubular segment is formed in the first hollow screw,
      wherein the tubular sleeve and the first hollow screw, in each section thereof along the middle axis, have an internal diameter equal to or greater than the internal diameter of the first tubular segment and the second tubular segment; and
   wherein the projecting head associated with the first piece of tube is in direct contact with the projecting head associated with the second piece of tube.

2. The hydraulic system according to claim 1, further comprising:
   a first throttled section in the first area of the tubular sleeve, formed inside the tubular sleeve coaxially to the middle axis and having an internal diameter equal to the internal diameter of the first tubular segment and the second tubular segment.

3. The hydraulic system according to claim 2, further comprising:
   a first annular cavity in the first area of the tubular sleeve, formed inside the tubular sleeve coaxially to the middle axis, axially aligned between the first hollow screw and the first throttled section, the first annular cavity having a diameter greater than the internal diameter of the first tubular segment and the second tubular segment, and
   a first deformable hydraulic sealing ring inserted in the first annular cavity.

4. The hydraulic system according to claim 2, further comprising:
   a second hollow screw, in screwing engagement with the second area of the tubular sleeve, wherein the second tubular segment is formed in the second hollow screw, and
   a second throttled section in the second area of the tubular sleeve, formed inside the tubular sleeve coaxially to the middle axis and having an internal diameter equal to the internal diameter of the first tubular segment and the second tubular segment,
   wherein the first throttled section and the second throttled section are axially aligned, one extending on from the other, to form a single throttling in a central area of the tubular sleeve.

5. The hydraulic system according to claim 4, further comprising:
   a second annular cavity in the second area of the tubular sleeve, formed inside the tubular sleeve coaxially to the middle axis, axially aligned between the second hollow screw and the second throttled section, the second annular cavity having a diameter greater than the internal diameter of the first tubular segment and the second tubular segment.

6. The hydraulic system according to claim 1, further comprising:
   a second hollow screw, in screwing engagement with the second area of the tubular sleeve, wherein the second tubular segment is formed in the second hollow screw.

7. The hydraulic connector system according to claim 6, further comprising:
   a second throttled section in the second area of the tubular sleeve, formed inside the tubular sleeve coaxially to the middle axis and having an internal diameter equal to the internal diameter of the first tubular segment and the second tubular segment.

8. The hydraulic system according to claim 7, further comprising:
   a second annular cavity in the second area of the tubular sleeve, formed inside the tubular sleeve coaxially to the middle axis, axially aligned between the second hollow screw and the second throttled section, the second annular cavity having a diameter greater than the internal diameter of the first tubular segment and the second tubular segment, and
   a second deformable hydraulic sealing ring inserted in the second annular cavity.

9. A process for connecting together a first piece of tube and a second piece of tube of a hydraulic system of a bicycle through a tubular sleeve, comprising:
   inserting a cap in the tubular sleeve from a first end of the tubular sleeve until the cap reaches a central area of the tubular sleeve,
   inserting the second piece of tube in the tubular sleeve from a second end of the tubular sleeve, until the second piece of tube rests axially directly against the cap, sealably constraining the second piece of tube to the tubular sleeve,
removing the cap from the tubular sleeve,
inserting the first piece of tube in the tubular sleeve from the first end of the tubular sleeve, until the first piece of tube rests axially directly against the second piece of tube, and
sealably constraining the first piece of tube to the tubular sleeve.

10. The process according to claim 9, further comprising:
preparing the first piece of tube by i) slotting on top a first hollow screw, having an internal diameter equal to an external diameter of the tube, then ii) slotting on top a first deformable hydraulic sealing ring, and iii) slotting a hollow first coupling terminal inside,
arranging the tubular sleeve, extending along a middle axis between a first end of the tubular sleeve and a second end of the tubular sleeve and comprising, at the first end, a first area configured for receiving the first hollow screw in screwing engagement and, internally, a first throttled section having an internal diameter equal to the external diameter of the tube,
inserting the cap, having a cap body and an enlarged cap head, in the tubular sleeve by screwing the cap body in the first area of the tubular sleeve until the enlarged cap head abuts against the tubular sleeve,
preparing the second piece of tube slotting a hollow second coupling terminal inside,
inserting the second piece of tube in the tubular sleeve from the second end of the tubular sleeve, until the second coupling terminal is made to rest axially directly against the cap,
after having sealably constrained the second piece of tube to the tubular sleeve and having removed the cap, inserting the first piece of tube in the tubular sleeve from the first end of the tubular sleeve, until the first coupling terminal is made to rest axially directly against the second coupling terminal,
pushing the first deformable hydraulic sealing ring slotted on the first piece of tube inside the tubular sleeve, until the first throttled section is reached, and
screwing the first hollow screw to the tubular sleeve, forcing and thus deforming the first deformable ring between the first piece of tube and the tubular sleeve, so as to sealably constrain the first piece of tube in the tubular sleeve.

11. The process according to claim 10, wherein:
the cap body has an external threading corresponding to a threading of the first hollow screw and the enlarged cap head, and
the cap body has an axial extension equal to half an axial extension of the tubular sleeve.

12. The process according to claim 11, wherein the sealably constraining the second piece of tube to the tubular sleeve is performed through crimping of the tubular sleeve on the second piece of tube.

13. The process according to claim 11, further comprising:
further preparing the second piece of tube firstly by slotting on top a second hollow screw, having internal diameter equal to the external diameter of the tube, then slotting on top a second deformable hydraulic sealing ring,
wherein the tubular sleeve comprises, at the second axial end, a second area adapted for receiving the second hollow screw in screwing engagement and, inside, a second throttled section having internal diameter equal to the external diameter of the tube,
wherein the sealably constraining the second piece of tube to the tubular sleeve comprises:
pushing the second deformable hydraulic sealing ring slotted on the second piece of tube inside the tubular sleeve, until the second throttled section is reached, and
screwing the second hollow screw to the tubular sleeve, forcing and thus deforming the second deformable ring between the second piece of tube and the tubular sleeve, so as to sealably constrain the second piece of tube in the tubular sleeve.

14. A hydraulic system of a bicycle comprising:
a first piece of tube and a second piece of tube, each of the first piece of tube and the second piece of tube provided with a respective hollow coupling terminal at least partially inserted therein,
wherein each hollow coupling terminal comprises a projecting head having an external diameter substantially equal to the external diameter of the respective piece of tube;
a hydraulic connector for removably joining together the first piece of tube and the second piece of tube, the hydraulic connector comprising:
a tubular sleeve extending along a middle axis, wherein a first area of the tubular sleeve is configured to be fixed to the first piece of tube and a second area of the tubular sleeve is configured to be fixed to the second piece of tube,
a first tubular segment and a second tubular segment, both extending along the middle axis and having an internal diameter configured for receiving the first piece of tube and the second piece of tube to be joined, and
a first hollow screw, in screwing engagement with the first area of the tubular sleeve, wherein the first tubular segment is formed in the first hollow screw,
wherein the tubular sleeve and the first hollow screw, in each section thereof along the middle axis, have an internal diameter equal to or greater than the external diameter of the first piece of tube and the second piece of tube; and
wherein the projecting head associated with the first piece of tube is in direct contact with the projecting head associated with the second piece of tube.

* * * * *